United States Patent
Harmon

(10) Patent No.: US 10,054,990 B1
(45) Date of Patent: Aug. 21, 2018

(54) ELECTRONIC DEVICE WITH HINGE AND CORRESPONDING SYSTEMS AND METHODS

(71) Applicant: Motorola Mobility LLC, Chicago, IL (US)

(72) Inventor: Roger Harmon, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/610,368

(22) Filed: May 31, 2017

(51) Int. Cl.
*G06F 1/16* (2006.01)
*E05F 1/02* (2006.01)
*E05C 17/64* (2006.01)
*E05D 3/06* (2006.01)
*F16C 11/04* (2006.01)

(52) U.S. Cl.
CPC ............. *G06F 1/1681* (2013.01); *E05D 3/06* (2013.01); *F16C 11/04* (2013.01); *G06F 1/1615* (2013.01); *G06F 1/1616* (2013.01); *G06F 1/1652* (2013.01); *G06F 1/1679* (2013.01); *E05Y 2900/606* (2013.01)

(58) Field of Classification Search
CPC .... G06F 1/1681; G06F 1/1615; G06F 1/1616; G06F 1/1652
USPC ................. 16/284, 296, 312, 341, 354, 319; 361/679.27, 679.55
See application file for complete search history.

(56) References Cited

U.S. PATENT DOCUMENTS

| | | | |
|---|---|---|---|
| 6,402,713 B1 | 6/2002 | Doyle | |
| 8,028,555 B2 | 10/2011 | Lurie | |
| 8,773,849 B2* | 7/2014 | Bohn | H04M 1/022 361/679.27 |
| 8,982,542 B2* | 3/2015 | Bohn | G06F 1/1681 361/679.06 |
| 9,535,465 B2* | 1/2017 | Bohn | G06F 1/1616 |
| 2004/0226138 A1* | 11/2004 | Harmon | E05D 11/1064 16/284 |
| 2012/0002360 A1* | 1/2012 | Seo | G06F 1/1616 361/679.01 |
| 2012/0162866 A1* | 6/2012 | Bohn | G06F 1/1681 361/679.01 |
| 2013/0342094 A1* | 12/2013 | Walters | G09F 19/00 312/319.2 |

(Continued)

OTHER PUBLICATIONS

Pemko CFM83 Full-Mortise Continuous Geared Hinge; https://www.qualitydoor.com/pemko-cfm83-continuous-hinge.html; Sited Visited Feb. 2017; Unknown Publication Date but prior to filing of present application.

(Continued)

*Primary Examiner* — Nidhi Thaker
(74) *Attorney, Agent, or Firm* — Philip H. Burrus, IV

(57) ABSTRACT

An electronic device includes a first device housing and a second device housing. A hinge couples the first device housing to the second device housing. The first device housing is pivotable about the hinge relative to the second device housing. The hinge includes a cam, which can be shaped like the head of a cat. A first follower is biased against a first side of the cat head shaped cam by a first spring disposed between the first follower and the first device housing. A second follower is biased against a second side of the cat head shaped cam by a second spring disposed between the second follower and the second device housing.

20 Claims, 10 Drawing Sheets

(56) References Cited

U.S. PATENT DOCUMENTS

| | | | |
|---|---|---|---|
| 2014/0042293 A1* | 2/2014 | Mok | G06F 1/1652 |
| | | | 248/682 |
| 2014/0287804 A1* | 9/2014 | Bohn | H04M 1/022 |
| | | | 455/575.3 |
| 2016/0302314 A1* | 10/2016 | Bae | G06F 1/16 |
| 2017/0264723 A1* | 9/2017 | Mok | H04M 1/0268 |

OTHER PUBLICATIONS

Car Door Hinge; Image; Unknown Image Source; Unknown publication date but prior to fling of present application.
Spectacle Hinged—Cam Mechanism; Image; Unknown source; Image obtained prior filing of present application.

\* cited by examiner

ELECTRONIC DEVICE WITH HINGE AND CORRESPONDING SYSTEMS AND METHODS

BACKGROUND

Technical Field

This disclosure relates generally to electronic devices and corresponding methods, and more particularly to hinged electronic devices.

Background Art

Sophisticated mobile electronic communication devices, such as smartphones and tablet computers, are becoming increasingly popular and are used by billions of people. These owners use mobile communication devices for many different purposes including, but not limited to, voice communications and data communications for text messaging, Internet browsing, commerce such as banking, and social networking.

Traditionally, handheld devices came in different mechanical configurations. A first configuration, known as a "candy bar," is generally rectangular in shape, has a rigid form factor, and has a display that is always visible. By contrast, a "clamshell" device has a mechanical hinge that allows one housing to pivot relative to the other. While there are also "pivot," "slider," and other devices, the candy bar and flip devices tend to be the most popular.

While candy bar devices offer simplicity of use, some consumers prefer a clamshell device. This can be true for a variety of reasons. Clamshell devices, when folded, generally have a smaller form factor than do candy bar devices. They therefore fit more easily in a pocket. Next, clamshell devices provide protection from the display when folded. This is in contrast to candy bar devices where the display is always exposed.

At the same time, market trends indicate that consumers have a general preference for devices with large displays. However, a hinge frequently interrupts the display of most clamshell devices, thereby limiting the size that the display can ultimately achieve. It would be desirable to have an improved electronic device that reconciles these issues by offers a larger display while still being able to fold about a hinge.

Figure 1:
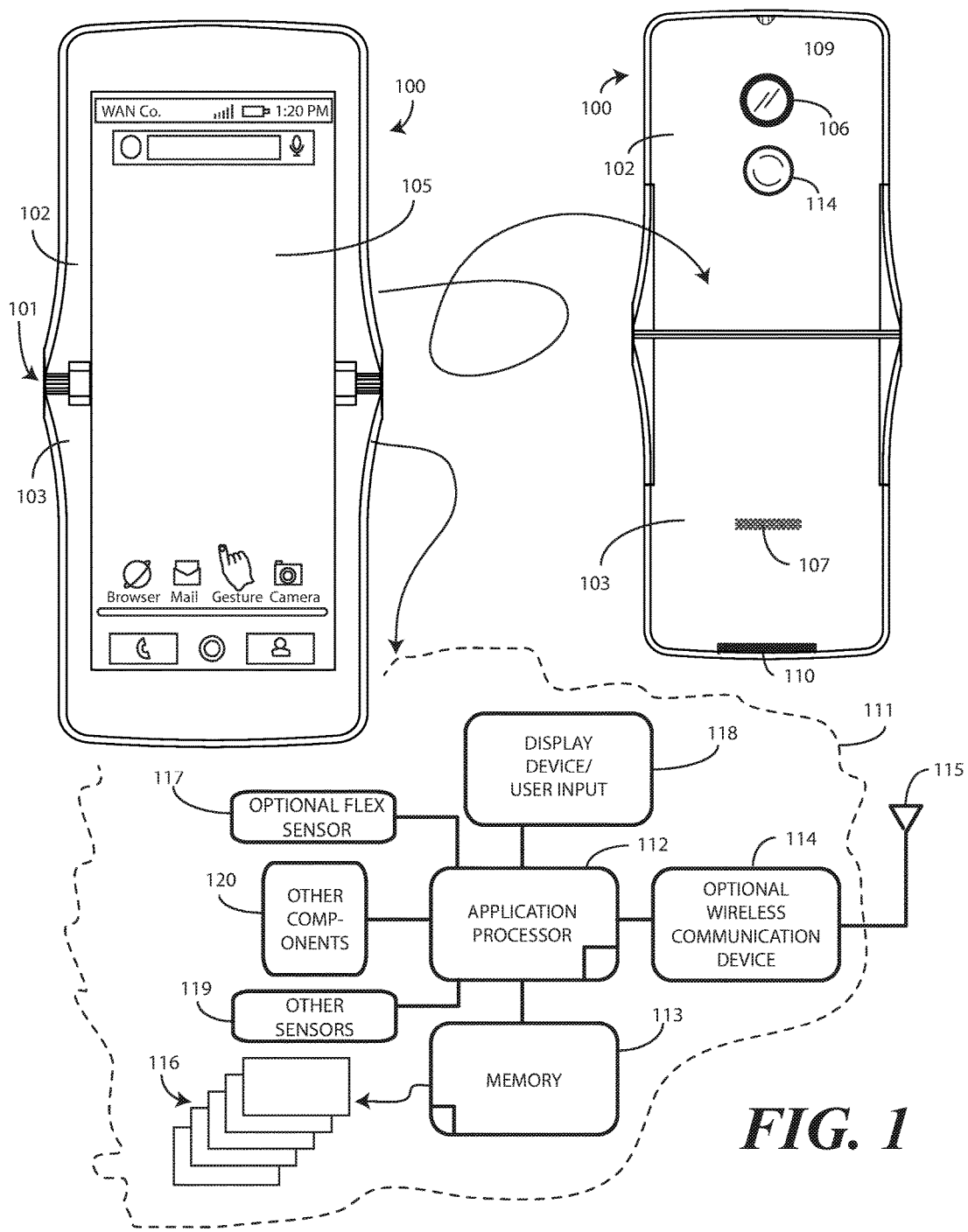
FIG. 1 illustrates a schematic block diagram of one explanatory pivotable electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a hinged electronic device, i.e., a clamshell device, which includes a flexible display. A hinge couples a first device housing and a second device housing such that the first device housing is pivotable about the hinge toward, or away from, the second device housing. The flexible display is inwardly folding and deforms when the first device housing of the electronic device pivots toward the second electronic device housing about the hinge from an open position toward or to a closed position. Advantageously, in one or more embodiments the hinge is operable to selectively "lock" or retain the first device housing and the second device housing in either the open or closed position with a minimal form factor, thereby allowing the inwardly folding display to maintain a desired service loop and not crease.

In one or more embodiments, the hinge includes a cam having a "cat head shape." As is known in the art, cams are frequently named by the shape they take along their major faces. Illustrating by example, there are heart cams, star cams, snail cams, elliptical cams, circular cams, wedge cams, and so forth. The cam configured in accordance with one or more embodiments of the disclosure is "cat head shaped" because, in one or more embodiments, it has a major face that has the appearance of a silhouette of a cat's head. Said differently, the major face includes one or more protrusions resembling cat ears spaced by a curvature resembling a cat forehead. The cam can also include a concave recess resembling an inverted cat chin. The chin is spaced from the ears by curvatures resembling cat cheeks. The cam is referred to as a "cat head shaped" cam to make it clear that, in the convention used by cam designers, the major face resembles the head of a cat and not the cathead of a ship, which is a large, rectangular beam. Accordingly, the term "cathead" cam is avoided and the term "cat head shaped" is employed.

In one or more embodiments, the hinge includes a cat head shaped cam, a first follower, and a second follower. In one or more embodiments, the first follower is biased against a first side of the cat head shaped cam by a first spring disposed between the first follower and the first device housing. Similarly, the second follower is biased against a second side of the cat head shaped cam by a second spring disposed between the second follower and the second device housing.

As the first device housing pivots about the hinge toward, or away from, the second device housing, the first follower and the second follower travel about the perimeter of the cat head shape. For example, in one or more embodiments the cat head shaped cam defines a first cat ear shaped protrusion and a second cat ear shaped protrusion. In one or more embodiments, the first cat ear shaped protrusion and the second cat ear shaped protrusion extend from a first side of the cat head shaped cam. At the same time, in one or more embodiments the cat head shaped cam defines a concave chin that is centrally located on a second side of the cat head shaped cam, where the second side is disposed opposite one or more pivot axes of the cat head shaped cam from the first side.

The inclusion of the cat ear shaped protrusions and the concave chin advantageously allows the hinge to selectively lock in either the open or closed position. For instance, in one or more embodiments, the first follower and the second follower situate between the first cat ear shaped protrusion and the second cat ear shaped protrusion when the first device housing is pivoted about the hinge toward the second device housing to a closed position. The first cat ear shaped protrusion and the second cat ear shaped protrusion retain the first follower and the second follower therebetween with sufficient force to lock the first device housing and the second device housing in the closed position.

By contrast, the first cat ear shaped protrusion and the second cat ear shaped protrusion situate between the first follower and the second follower when the first device housing is pivoted about the hinge away from the second device housing toward an open position. In one or more embodiments, the first device housing defines a first protuberance abutting the cat head shaped cam. Similarly, the second device housing defines a second protuberance abutting the cat head shaped cam. In one or more embodiments, apexes of the first protuberance and the second protuberance situate within the concave chin when the first device housing is pivoted about the hinge away from the second device housing to an open position. Accordingly, the first protuberance and the second protuberance situate within the concave chin to selectively lock the first device housing and the second device housing in the open position.

Electronic devices having hinges configured in accordance with one or more embodiments of the disclosure offer numerous advantages over prior art hinges. Illustrating by example, prior art hinges often include actuators and springs that are aligned parallel to the bending axis. Such hinges do not work with flexible displays because the display bends into the hinge, thereby creating a mechanical interference. The only way around this is to design an excessively thick device that is extremely wide. Additionally, prior art hinges can have form factors that situate above the split line between two device housings. This can cause the occurrence of large, visible protrusions at the pivot point, which is undesirable.

Advantageously, hinges configured in accordance with one or more embodiments of the disclosure sit flatter than do prior art hinges when in the open position. Moreover, in one or more embodiments the cat head shaped cam is disposed to the side of the flexible display and is oriented orthogonally relative to the axis of rotation between the first device housing and the second device housing. This allows the overall hinge area beneath the flexible display to be narrower.

Another advantages is that the cat head shape of the cam allows the torque required to exit the locked open position or the locked closed position to be precisely controlled. This is important in flexible display applications because flexible displays have a tendency to hold the shape of the closed position when opened. They can therefore appear "wavy" in the open position. Embodiments of the present disclosure overcome this problem by placing the flexible display in tension when in the open position. The locking force afforded by the hinge balances the tension on the display. Additionally, the locking force in the open position can be sufficiently high that a flatter, open flexible display results. Other advantages will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 102 and a second device housing 103. In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, shown and described below with reference to FIG. 2, and an open position, shown and described below with reference to FIGS. 4-5.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge. However, in other embodiments two or more hinges can be incorporated into the electronic device n100 to allow it to be folded in multiple locations.

This illustrative electronic device 100 of FIG. 1 includes a display 105. The display 105 can optionally be touch-sensitive. In one embodiment where the display 105 is touch-sensitive, the display 105 can serve as a primary user interface of the electronic device 100. Users can deliver user input to the display 105 of such an embodiment by delivering touch input from a finger, stylus, or other objects disposed proximately with the display.

In one embodiment, the display 105 is configured as an organic light emitting diode (OLED) display fabricated on a flexible plastic substrate. This allows the display 105 to be flexible so as to deform when the first device housing 102 pivots about the hinge 101 relative to the second device housing 103. However, it should be noted that other types of displays would be obvious to those of ordinary skill in the art having the benefit of this disclosure. In one or more embodiments, an OLED is constructed on flexible plastic substrates can allow the display 105 to become flexible in one or more embodiments with various bending radii. For example, some embodiments allow bending radii of between thirty and six hundred millimeters to provide a bendable display. Other substrates allow bending radii of around five millimeters to provide a display that is foldable through active bending. Other displays can be configured to accommodate both bends and folds. In one or more embodiments the display 105 may be formed from multiple layers of flexible material such as flexible sheets of polymer or other materials.

In this illustrative embodiment, the display 105 is coupled to the first device housing 102 and the second device housing 103. Accordingly, the display 105 spans the hinge 101 in this embodiment. As will be described in more detail with reference to FIGS. 11-12 below, in one or more embodiments the display 105 is actually coupled to one, or two, slidable trays that situate within one or both of the first device housing 102 and the second device housing 103. The use of one or two slidable trays advantageously allows the display 105 to be placed in tension when the electronic device 100 is in the open position. This causes the display 105 to be flat, rather than wavy due to mechanical memory effects, when the electronic device 100 is in the open position.

Features can be incorporated into the first device housing 102 and/or the second device housing 103. Examples of such features include an optional camera 106 or an optional speaker port 107, which are shown disposed on the rear side of the electronic device 100 in this embodiment, but could be placed on the front side as well. In this illustrative embodiment, a user interface component 108, which may be a button or touch sensitive surface, can also be disposed along the rear side of the first device housing 102. As noted, any of these features are shown being disposed on the rear side of the electronic device 100 in this embodiment, but could be located elsewhere, such as on the front side in other embodiments.

In one embodiment, the electronic device 100 includes one or more connectors 109,110, which can include an analog connector, a digital connector, or combinations thereof. In this illustrative embodiment, connector 109 is an analog connector disposed on a first end, i.e., the top end as viewed in FIG. 1, of the electronic device 100, while connector 110 is a digital/power connector disposed on a second end opposite the first end, which is the bottom end as viewed in FIG. 1.

A block diagram schematic 111 of the electronic device 100 is also shown in FIG. 1. In one embodiment, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 112 during operation.

In this illustrative embodiment, the electronic device 100 also includes a communication circuit 114 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 114 may also utilize wireless technology for communication, such as, but are not limited to, peer-to-peer or ad hoc communications such as HomeRF, Bluetooth and IEEE 802.11 (a, b, g or n), and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the electronic device 100. For example, in one embodiment the one or more processors 112 comprise one or more circuits operable with one or more user interface devices, which can include the display 105, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

Figure 2:
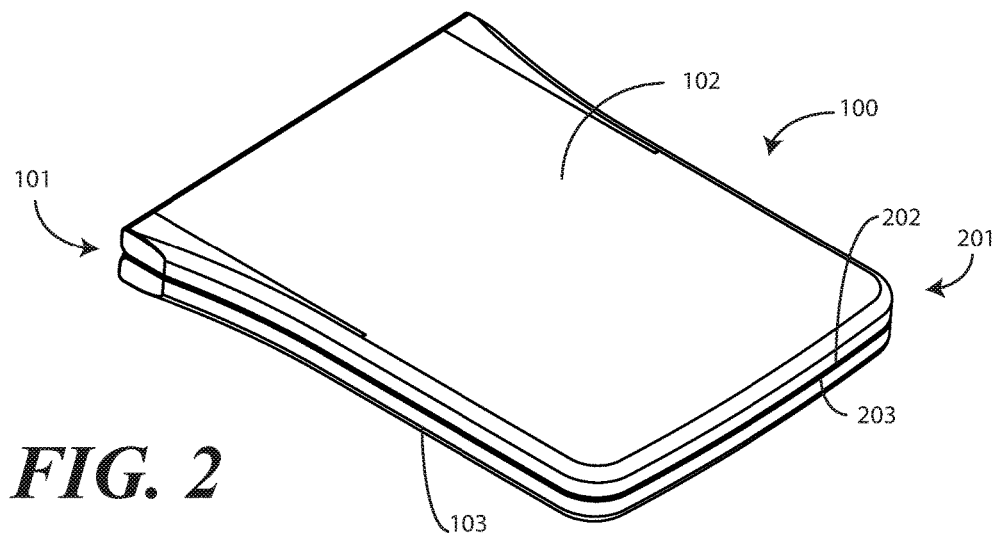
FIG. 2 illustrates one explanatory electronic device in a closed state where a first device housing is pivoted about a hinge toward a second device housing to a closed position in accordance with one or more embodiments of the disclosure.
Figure 3:
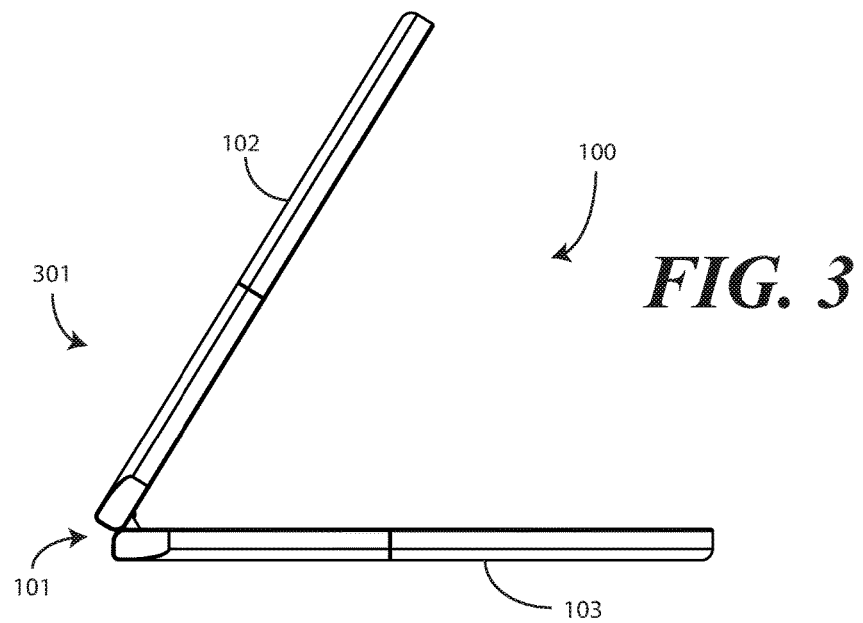
FIG. 3 illustrates one explanatory electronic device in a partially open state where the first device housing is partially pivoted about the hinge away from the second device housing toward, but not fully to, an open position in accordance with one or more embodiments of the disclosure.

In one embodiment, the electronic device 100 includes one or more flex sensors 117, operable with the one or more processors 112, to detect a bending operation that causes the first device housing 102 to pivot about the hinge 101 relative to the second device housing 103, thereby transforming the electronic device 100 into a deformed geometry, such as that shown in FIGS. 2-3. The inclusion of flex sensors 117 is optional, and in some embodiment flex sensors 117 will not be included.

In one embodiment, the flex sensors 117 comprise passive resistive devices manufactured from a material with an impedance that changes when the material is bent, deformed, or flexed. By detecting changes in the impedance as a function of resistance, the one or more processors 112 can use the one or more flex sensors 117 to detect bending of the first device housing 102 about the hinge 101 relative to the second device housing 103. In one or more embodiments, each flex sensor 117 comprises a bi-directional flex sensor that can detect flexing or bending in two directions. In one embodiment, the one or more flex sensors 117 have an impedance that increases in an amount that is proportional with the amount it is deformed or bent.

In one embodiment, each flex sensor 117 is manufactured from a series of layers combined together in a stacked structure. In one embodiment, at least one layer is conductive, and is manufactured from a metal foil such as copper. A resistive material provides another layer. These layers can be adhesively coupled together in one or more embodiments. The resistive material can be manufactured from a variety of partially conductive materials, including paper-based materials, plastic-based materials, metallic materials, and textile-based materials. In one embodiment, a thermoplastic such as polyethylene can be impregnated with carbon or metal so as to be partially conductive, while at the same time being flexible.

In one embodiment, the resistive layer is sandwiched between two conductive layers. Electrical current flows into one conductive layer, through the resistive layer, and out of the other conductive layer. As the flex sensor 117 bends, the impedance of the resistive layer changes, thereby altering the flow of current for a given voltage. The one or more processors 112 can detect this change to determine an amount of bending. Taps can be added along each flex sensor 117 to determine other information, including the amount of bending, the direction of bending, and so forth. The flex sensor 117 can further be driven by time-varying signals to increase the amount of information obtained from the flex sensor 117 as well. While a multi-layered device as a flex sensor 117 is one configuration suitable for detecting at least a bending operation occurring to deform the electronic device 100 and a geometry of the electronic device 100 after the bending operation, others can be used as well. Other types of flex sensors 117 will be obvious to those of ordinary skill in the art having the benefit of this disclosure.

In one embodiment, the one or more processors 112 may generate commands or execute control operations based on information received from the various sensors, including the one or more flex sensors 117, the user interface 118, or the other sensors 119. The one or more processors 112 may also generate commands or execute control operations based upon information received from a combination of the one or more flex sensors 117, the user interface 118, or the other sensors 119. Alternatively, the one or more processors 112 can generate commands or execute control operations based upon information received from the one or more flex sensors 117 or the user interface 118 alone. Moreover, the one or more processors 112 may process the received information alone or in combination with other data, such as the information stored in the memory 113.

The one or more other sensors 119 may include a microphone, an earpiece speaker, a second loudspeaker (disposed beneath speaker port 107), and a user interface component such as a button or touch-sensitive surface. The one or more other sensors 119 may also include key selection sensors, proximity sensors, a touch pad sensor, a touch screen sensor, a capacitive touch sensor, and one or more switches. Touch sensors may used to indicate whether any of the user actuation targets present on the display 105 are being actuated. Alternatively, touch sensors disposed in the electronic device 100 can be used to determine whether the electronic device 100 is being touched at side edges or major faces of the first device housing 102 or the second device housing 103. The touch sensors can include surface and/or housing capacitive sensors in one embodiment. The other sensors 119 can also include audio sensors and video sensors (such as a camera).

The other sensors 119 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion.

Other components 120 operable with the one or more processors 112 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Turning now to FIG. 2, illustrated therein is the electronic device 100 in a closed state. In this state, the first device housing 102 has been pivoted about the hinge 191 toward the second device housing 103 to a closed position 201. When in the closed position 201, a front surface 202 of the first device housing 102 abuts a front surface 203 of the second device housing 103. Effectively, the first device housing 102 and the second device housing 103 are analogous to clam shells that have been shut by the claim, thereby giving rise to the "clamshell" style of device.

As noted above, and as will be explained in more detail below, in one or more embodiments the shape of the cam of the hinge 101, and in particular its inclusion of the cat ear shaped protrusions and the concave chin advantageously allows the hinge 101 to selectively lock in either the open or closed position. The first follower and the second follower of the hinge 101 situate between the first cat ear shaped protrusion and the second cat ear shaped protrusion when the first device housing 102 is pivoted about the hinge 101 toward the second device housing 103 to the closed position 201.

In some embodiments, additional features can be included to further retain the electronic device 100 in the closed position 201. Illustrating by example, in another embodiment, a mechanical latch can be included to retain the first device housing 102 and the second device housing 103 in the closed position 201. In still another embodiment, magnets can be incorporated into the front surface 202 of the first device housing 102 and the front surface 203 of the second device housing 103. For instance, magnets can be placed in the first device housing 102 and the second device housing 103 to retain the first device housing 102 and the second device housing 103 in the closed position 201. In still other embodiments, frictional elements can be incorporated into the hinge 101 to retain the first device housing 102 and the second device housing 103 in a particular position. A stator motor could be integrated into the hinge 101 as well. Still other mechanical structures and devices suitable for retaining the electronic device 100 in the closed position 201 will be obvious to those of ordinary skill in the art having the benefit of this disclosure.

Turning now to FIG. 3, the electronic device 100 is shown being transitioned from the closed position (201) of FIG. 2 to an open position. Specifically, the first device housing 102 is pivoting about the hinge 101 away from the second device housing 103 toward an open position. The position shown in FIG. 3 is a "tent position" 301. As will be described in more detail below, the cat ear shaped protrusions of the cam advantageously bias the first device housing 102 toward the second device housing 103 at angles more acute than that shown in FIG. 3 to assist in transitioning the electronic device 100 to the closed position (201). At the same time, the cat ear shaped protrusions advantageously bias the first device housing 102 away from the second device housing 103 at angles more obtuse than that shown in FIG. 3 to assist in transitioning the electronic device 100 to the open position shown in FIGS. 4 and 5.

Figure 4:
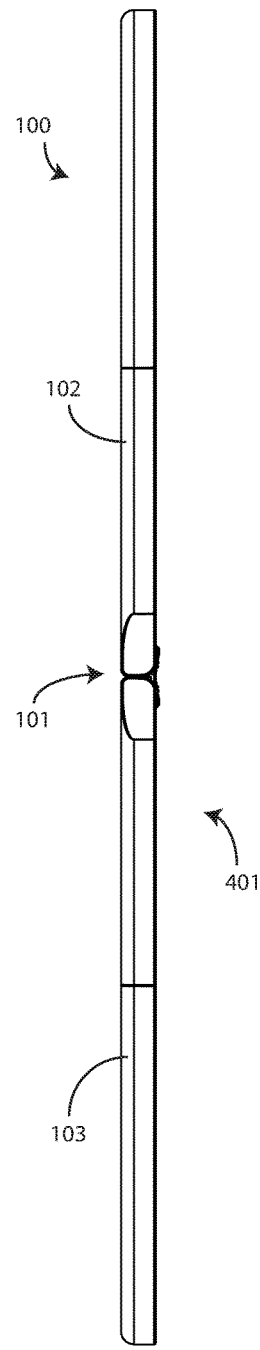
FIGS. 4-5 illustrate one explanatory electronic device in an open state where the first device housing is pivoted about the hinge away from the second device housing to an open position in accordance with one or more embodiments of the disclosure.
Figure 5:
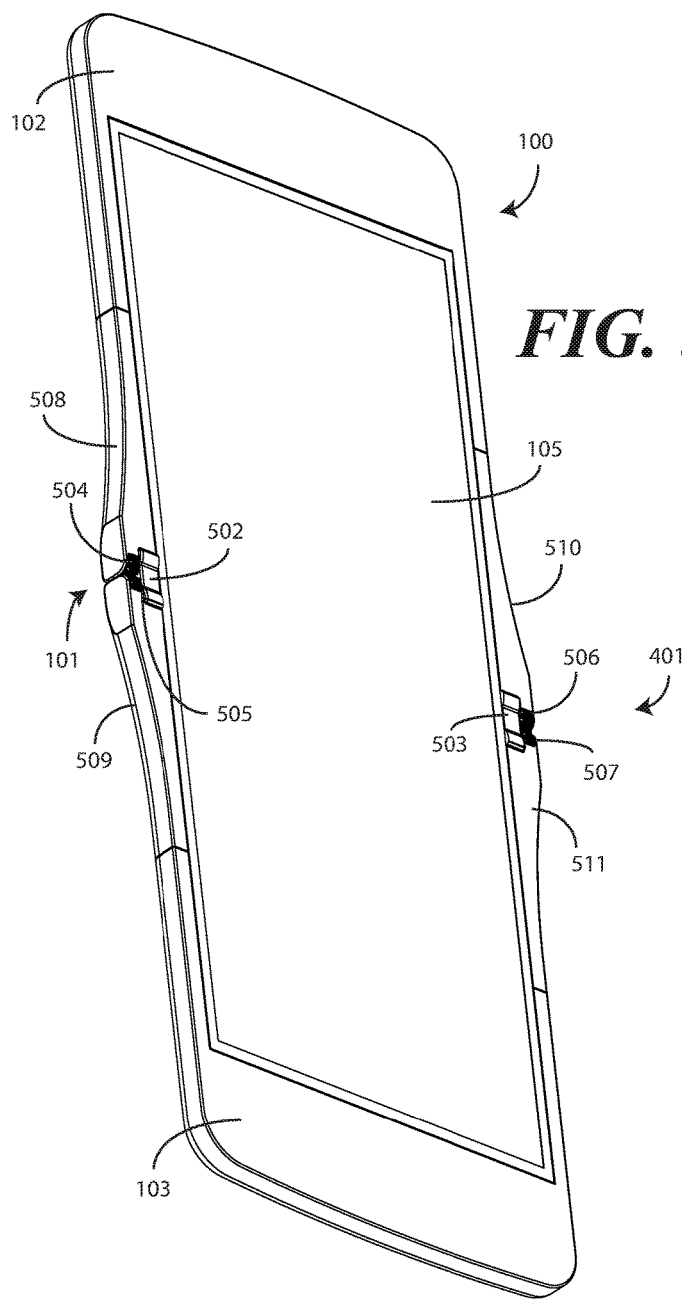

Turning now to FIGS. 4 and 5, illustrated therein is the electronic device 100 in an open position 401. In the open position, the first device housing 102 is rotated about the hinge 101 180-degrees out of phase with the second device housing 103 such that the first device housing 102 and the second device housing 103 effectively define a plane. The display 105 has been elongated into a flat position. As noted above, and as will be described in more detail below, in one or more embodiments this occurs due to the action of one or more slidable trays disposed within one or both of the first device housing 102 and the second device housing 103.

With particular attention to FIG. 5, one or more components of the hinge 101 can be seen. In this illustrative embodiment, the hinge 101 includes a first cam 502 and a second cam 503. Adjacent to the first cam 502 is a first toothed wheel 504 and a second toothed wheel 505 that engage to create a symmetric angular rotation of the first device housing 102 and the second device housing 103 when the first device housing 102 pivots about the hinge 101 relative to the second device housing 103. Similarly, a third toothed wheel 506 and a fourth toothed wheel 507 are situated adjacent to the second cam 503 to perform the same function. In this illustrative embodiment, the first cam 502 and the second cam 503 are situated farther interior of the electronic device 100 than are the first toothed wheel, 504, the second toothed wheel 505, the third toothed wheel 506, or the fourth toothed wheel 507. Said differently, in this embodiment the first cam 502 and the second cam 503 are situated between the engagement of the first toothed wheel, 504 and the second toothed wheel 505, and the engagement of the third toothed wheel 506 and the fourth toothed wheel 507. In this embodiment, the display 105 is disposed between the first cam 502 and the second cam 503.

Four housing members 508,509,510,511 couple to the first device housing 102 and the second device housing 103. These housing members 508,509,510,511 perform two functions. First, the provide an axis for a first pivot and a second pivot of the hinge 101. Second, they provide housings for followers that bias against the first cam 502 and the second cam 503.

In one or more embodiments, the housing members 508,509,510,511 are separate from the first device housing 102 and the second device housing 103, but are coupled fixedly thereto by fasteners. In other embodiments, the housing members 508,509,510,511 can be integrated into the first device housing 102 and the second device housing. In either embodiment, the housing members 508,509,510, 511 effectively become sides and contours of the first device housing 102 and the second device housing 103. Accordingly, as used herein the housing members 508,509,510,511 can alternatively be referred to as components of, extensions of, or portions of the first device housing 102 and the second device housing 103, respectively.

Figure 6:
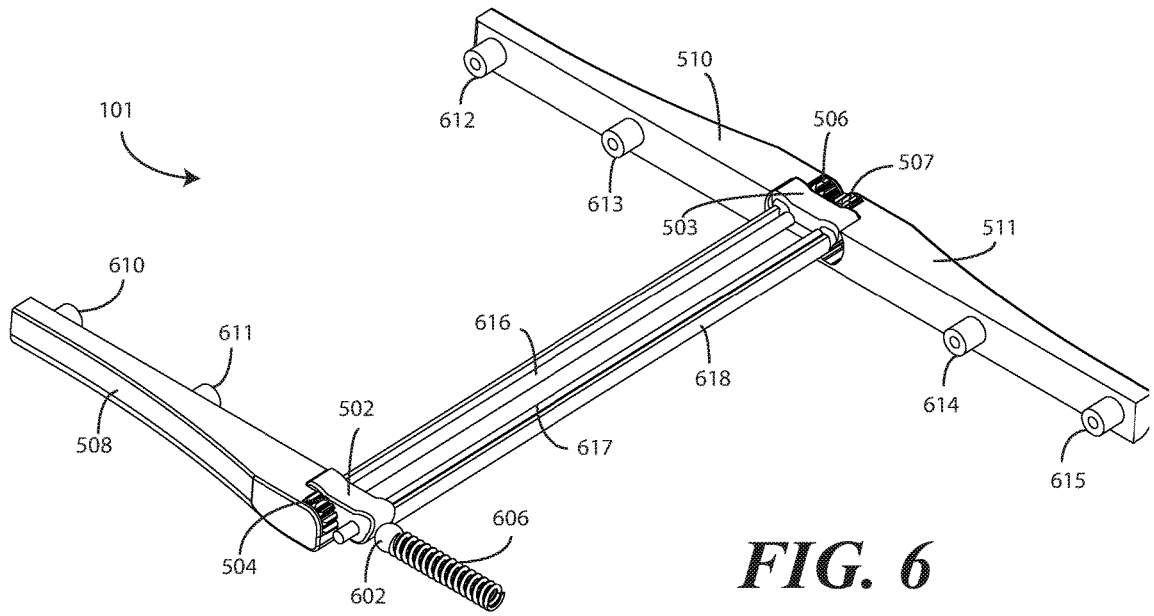
FIG. 6 illustrates one or more explanatory components for one or more hinges configured in accordance with one or more embodiments of the disclosure.

Turning now to FIG. 6, illustrated therein is the hinge 101 of FIGS. 2-5. As shown, the hinge 101 includes the first cam 502 and the second cam 503. Adjacent to the first cam 502 is the first toothed wheel 504, which is defined at the end of housing member 508. (The second toothed wheel (505), which engages the first toothed wheel 504 is not shown so that follower 602 and spring 606, which are situated within housing member (509), can be seen.) Adjacent to the second cam 503 are the third toothed wheel 506 and the fourth toothed wheel 507. In this illustrative embodiment, the housing members 508,(509),510,511 each comprise one or more screw bosses 610,611,612,613,614,615 so that the housing members 508,(509),510,511 can be coupled to the first device housing (102) and the second device housing (103), respectively.

As housing member 509 is removed, a follower 602 and spring 606 are visible. In one or more embodiments, a corresponding follower and spring is disposed within each of the other housing members 508,510,511. Accordingly, in one or more embodiments where two cams, i.e., the first cam 502 and the second cam 503, are included, the hinge 101 will include four followers and four springs. Where only one cam is used, two followers and two springs will be used. Other configurations will be obvious to those of ordinary skill in the art having the benefit of this disclosure.

In this illustrative embodiment, the hinge 101 includes a first pivot 616 and a second pivot 617. Each of the first pivot 616 and the second pivot 617 extends through an aperture in the first cam 502 and the second cam 503, and engages a corresponding aperture in each of the housing members 508,(509),510,511. The removal of housing member (509) illustrated how second pivot 617 passes through an aperture in the first cam 502 and would then, by protruding through the first cam 502, engage an aperture in the housing member (509). The same configuration occurs with the remaining housing members 508,510,511 in one or more embodiments.

In this illustrative embodiment, a pivot cover tray 618 couples the first cam 502 and the second cam 503. In one or more embodiments, the pivot cover tray 618 covers the first pivot 616 and the second pivot 617, and serves as an exterior housing member at the hinge between the housing members 508,(509),510,511. In other embodiments, the pivot cover tray 618 will be excluded and extensions of the first device housing (102) and the second device housing (103) will cover the first pivot 616 and the second pivot 617. Still other configurations will be obvious to those of ordinary skill in the art having the benefit of this disclosure.

Figure 7:
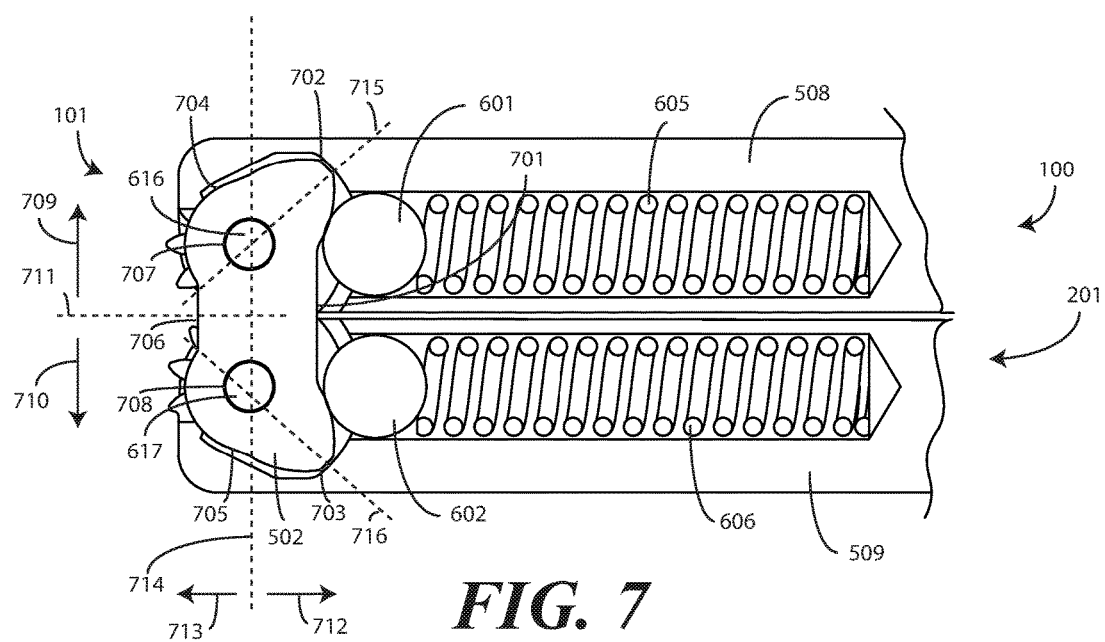
FIG. 7 illustrates a cut-away view of an electronic device illustrating explanatory hinge components when the first device housing is pivoted about the hinge toward the second device housing to a closed position in accordance with one or more embodiments of the disclosure.

Turning now to FIG. 7, illustrated therein is a cut-away view of the electronic device 100 illustrating the first cam 502. The configuration of the first cam 502 is the same as that of the configuration of the second cam (503) in one or more embodiments. Accordingly, the description of the first cam 502 and its configuration would be the same for the second cam (503), which is omitted here for brevity.

As shown in FIG. 7, the first cam 502 looks strikingly like the head of a cat. In the view of FIG. 7, the cat head is turned on its head. However, as shown, the cat head includes a cat forehead shaped curvature 701, a first cat ear shaped protrusion 702, and a second cat ear shaped protrusion 703. The cat forehead shaped curvature 701 is disposed between the first cat ear shaped protrusion 702, and the second cat ear shaped protrusion 703.

A first cat cheek shaped curvature 704 extends between the first cat ear shaped protrusion 702 and a concave chin 706. The concave chin 706 defines a concave recess into the cam 502. Similarly, a second cat cheek shaped curvature 705 extends between the second cat ear shaped protrusion 703 and the concave chin 706. A first aperture 707 defines a first cat eye, and a second aperture 708 defines a second cat eye. As previously described, the first pivot 616 extends through the first aperture 707, which is an eye aperture when considering the first cam 502 to be cat head shaped, while the second pivot 617 extends through the second aperture 708, which is also an eye aperture in this embodiment.

In this illustrative embodiment, the first cat ear shaped protrusion 702 and the second cat ear shaped protrusion 703 are disposed on, and extend from, a first side 712 of the cat head shaped cam 502. Meanwhile, the concave chin 706 is centrally located on a second side 713 of the cat head shaped cam 502. With reference to the description of the location of the first cat ear shaped protrusion 702 and the second cat ear shaped protrusion 703 relative to the concave chin 706, the first side 712 and the second side 713 are separated by a reference line 714 running through the first eye aperture 707 and the second eye aperture 708. Said differently, the second side 713 is disposed opposite axes of the first pivot 616 and the second pivot 617 of the cat head shaped cam 502 from the first side 712.

As shown in FIG. 7, the hinge 101 further comprises a first follower 601 and a second follower 602. The first follower 601 is biased against a first side 709 of the cat head shaped cam 502 by a first spring 605 disposed between the first follower 601 and first housing member 509. Similarly, the second follower 602 is biased against a second side 710 of the cat head shaped cam 502 by a second spring 606 disposed between the second follower 602 and the second housing member 509. With reference to the description of the first follower 601 and the second follower 602, the first side 709 and the second side 710 are separated by a reference line 711 running from the cat forehead shaped curvature 701 to the concave chin 706 between the first eye aperture 707 and the second eye aperture 708.

Since the concave chin 706 is concave, it defines a detent. In this illustrative embodiment, the first pivot 616 engages the cam 502 along a first axis 715 defined between the first protrusion, i.e., the first cat ear shaped protrusion 702, and the first detent defined by a first side of the concave chin 706. Similarly, in this embodiment the second pivot 617 engages the cam 502 along a second axis 716 defined between the second protrusion, i.e., the second cat ear shaped protrusion 703, and the second detent defined by the second side of the concave chin 706.

As shown in FIG. 7, the electronic device 100 is in the closed position 201. In one or more embodiments, the first follower 601 and the second follower 602 situate between the first cat ear shaped protrusion 702 and the second cat ear shaped protrusion 703, as shown in FIG. 7, when the first device housing (102) is pivoted about the hinge 101 toward the second device housing (103) to the closed position 201. The inner slopes of the first cat ear shaped protrusion 702 and the second cat ear shaped protrusion 703, each of which is roughly thirty degrees relative to the cat forehead shaped curvature 701, retains the first follower 601 and the second follower 602 between the first cat ear shaped protrusion 702 and the second cat ear shaped protrusion 703 to keep the electronic device 100 in the closed position 201. To open the electronic device 100, a user must apply sufficient force to compress the first spring 605 and the second spring 606 sufficiently to allow the first follower 601 and the second follower 602 to pass over the first cat ear shaped protrusion 702 and the second cat ear shaped protrusion 703, respectively. This is shown in FIG. 8.

Figure 8:
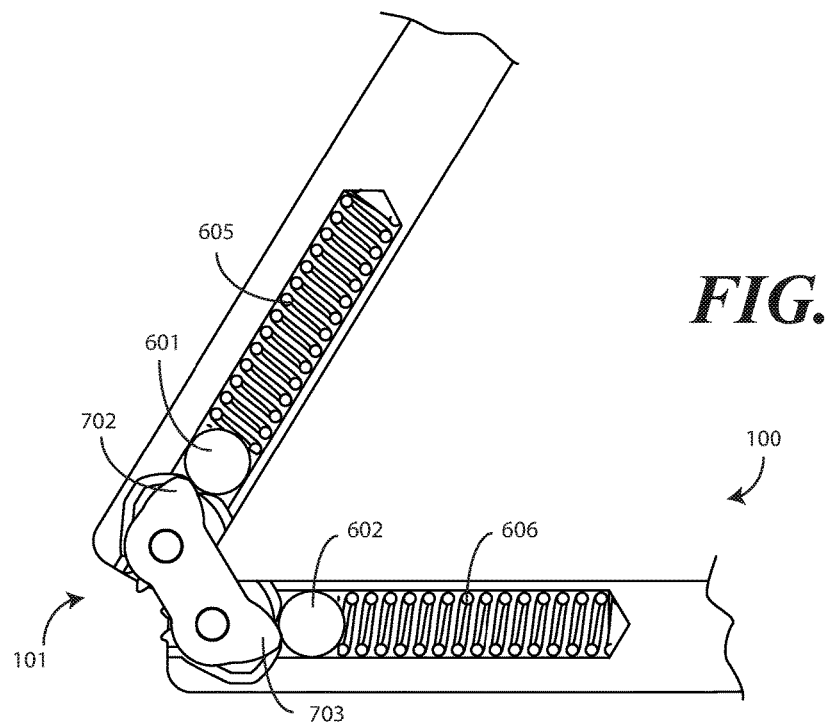
FIG. 8 illustrates a cut-away view of an electronic device illustrating explanatory hinge components when the first device housing is partially pivoted about the hinge away from the second device housing toward, but not fully to, an open position in accordance with one or more embodiments of the disclosure.

Turning now to FIG. 8, the electronic device 100 is shown being transitioned from the closed position (201) of FIG. 7 to an open position. Specifically, the first device housing (102) is pivoting about the hinge 101 away from the second device housing (103) toward an open position. This causes the first spring 605 and the second spring 606 to compress as the first follower 601 and the second follower 602 climb the first cat ear shaped protrusion 702 and the second cat ear shaped protrusion 703, respectively. As the first follower 601 and the second follower 602 have not yet reached apexes of the first cat ear shaped protrusion 702 and the second cat ear shaped protrusion 703, if the user were to let go of the first device housing (102) and the second device housing (103), the electronic device 100 would return to the closed position (201) due to the fact that the first cat ear shaped protrusion 702 and the second cat ear shaped protrusion 703 cause the first follower 601 and the second follower 602 to bias toward the closed position when between apexes of the first cat ear shaped protrusion 702 and the second cat ear shaped protrusion 703, respectively.

Figure 9:
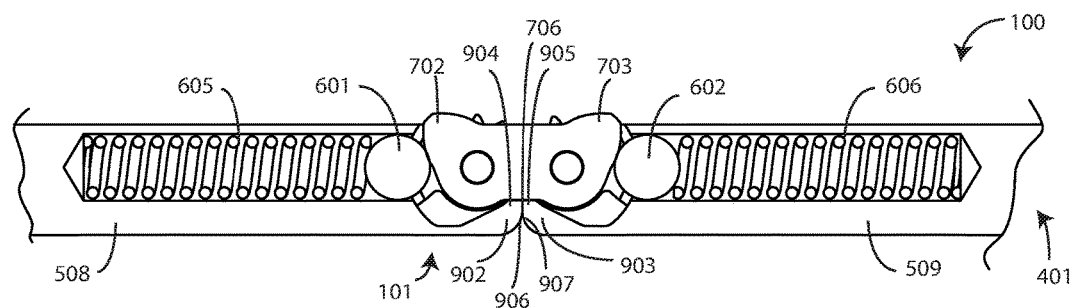
FIG. 9 illustrates a cut-away view of an electronic device illustrating explanatory hinge components when the first device housing is pivoted about the hinge away from the second device housing to an open position in accordance with one or more embodiments of the disclosure.

Turning now to FIG. 9, the first device housing (102) and the second device housing (103) have been opened sufficiently that the first follower 601 and the second follower 602 pass over apexes of the first cat ear shaped protrusion 702 and the second cat ear shaped protrusion 703. When this occurs, the same spring action described in the preceding paragraph works to bias the first device housing (102) and the second device housing (103) toward the open position 401, which is shown in FIG. 9.

In the open position 401, the first cat ear shaped protrusion 702 and the second cat ear shaped protrusion 703 situate between the first follower 601 and the second follower 602. This occurs when the first device housing (102) is pivoted about the hinge (101) away from the second device housing (103) to the open position 401, as shown in FIG. 9.

As was the case with the closed position (201), in one or more embodiments a retention system is in place to retain the first device housing (102) and the second device housing (103) in the open position 401. In one or more embodiments, housing member 508, which constitutes an extension of the first device housing (102), defines a first protuberance 902. As shown in FIG. 9, the first protuberance 902 abuts the cat head shaped cam 502. Similarly, housing member 509, which constitutes an extension of the second device housing (103), defines a second protuberance 903. The second protuberance 903 also abuts the cat head shaped cam 502.

When in the open position 501, apexes 904,905 of the first protuberance 902 and the second protuberance 903 situate within the concave chin 706 of the cat head shaped cam 502 when the first device housing (102) is pivoted about the hinge 101 away from the second device housing (103) to the open position 401. Advantageously, the depth of the concave chin 706 and the height of the apexes 904,905 of the first protuberance 902 and the second protuberance 903, combined with the flexibility of the housing members 508,509, provide a retention force to retain the first device housing (102) and the second device housing (103) in the open position 401.

In addition to providing this retention force, the housing members 508,509 also provide a mechanical stop to prevent the first device housing (102) and the second device housing (103) from pivoting beyond the open position 401, i.e., beyond 180-degrees. In this illustrative embodiment, the first protuberance 902 terminates at a first wall 906. Similarly, the second protuberance 903 terminates at a second wall 907. As shown in FIG. 9, the first wall 906 and the second wall 907 abut when the first device housing (102) is pivoted about the hinge 101 away from the second device housing (103) to the open position 401.

By comparing FIG. 7 and FIG. 9, the advantages of using a cat head shaped cam 502 configured in accordance with one or more embodiments of the disclosure can readily be seen. As shown and described, the first cat ear shaped protrusion 702 and the second cat ear shaped protrusion 703 define a first detent, formed by a recess defined by the inner slopes of the first cat ear shaped protrusion 702 and the second cat ear shaped protrusion 703 and the cat forehead shaped curvature 701, that retains the first device housing (102) at a first predefined angular alignment, i.e., the closed position 201, relative to the second device housing (103) about the hinge 101. Meanwhile, the concave chin 706 defines a second detent that works retaining the first device housing (102) at a second predefined angular alignment, i.e., the open position 401, relative to the second device housing (103) about the hinge 101.

Figure 10:
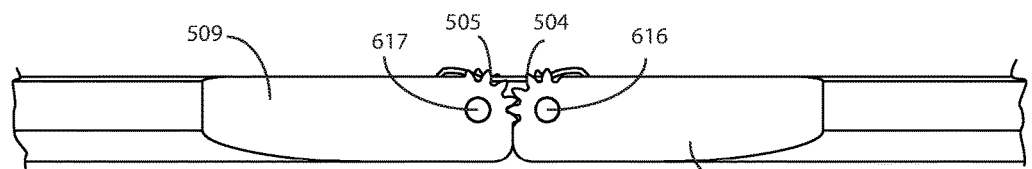
FIG. 10 illustrates a cut-away view of an electronic device illustrating explanatory hinge components when the first device housing is pivoted about the hinge away from the second device housing to an open position in accordance with one or more embodiments of the disclosure.

FIG. 10 shows a cutaway view of the opposite side of the hinge 101 from that shown in FIG. 9. From this view, the first toothed wheel 504 and the second toothed wheel 505 can be seen. As noted above, in one or more embodiments housing member 508, which constitutes an extension of the first device housing (102), comprises at least a first toothed wheel 504. Housing member 509, which constitutes an extension of the second device housing (103), comprises at least a second toothed wheel 505. The first toothed wheel 504 engages the second toothed wheel 505 when the first device housing (102) pivots about the hinge 101 relative to the second device housing (103). The engagement of the first toothed wheel 504 and the second toothed wheel 505 creates a symmetric angular rotation of the first device housing (102) and the second device housing (103) when the first device housing (102) pivots about the hinge relative to the second device housing (103).

FIG. 10 also shows how the first pivot 616 and the second pivot 617 engage housing member 508 and housing member 509, respectively. By terminating in housing members 508, 509 and passing through the cat head shaped cam (502), the cat head shaped cam 502 is pivotable about both the first pivot 616 and the second pivot 617.

Figure 11:
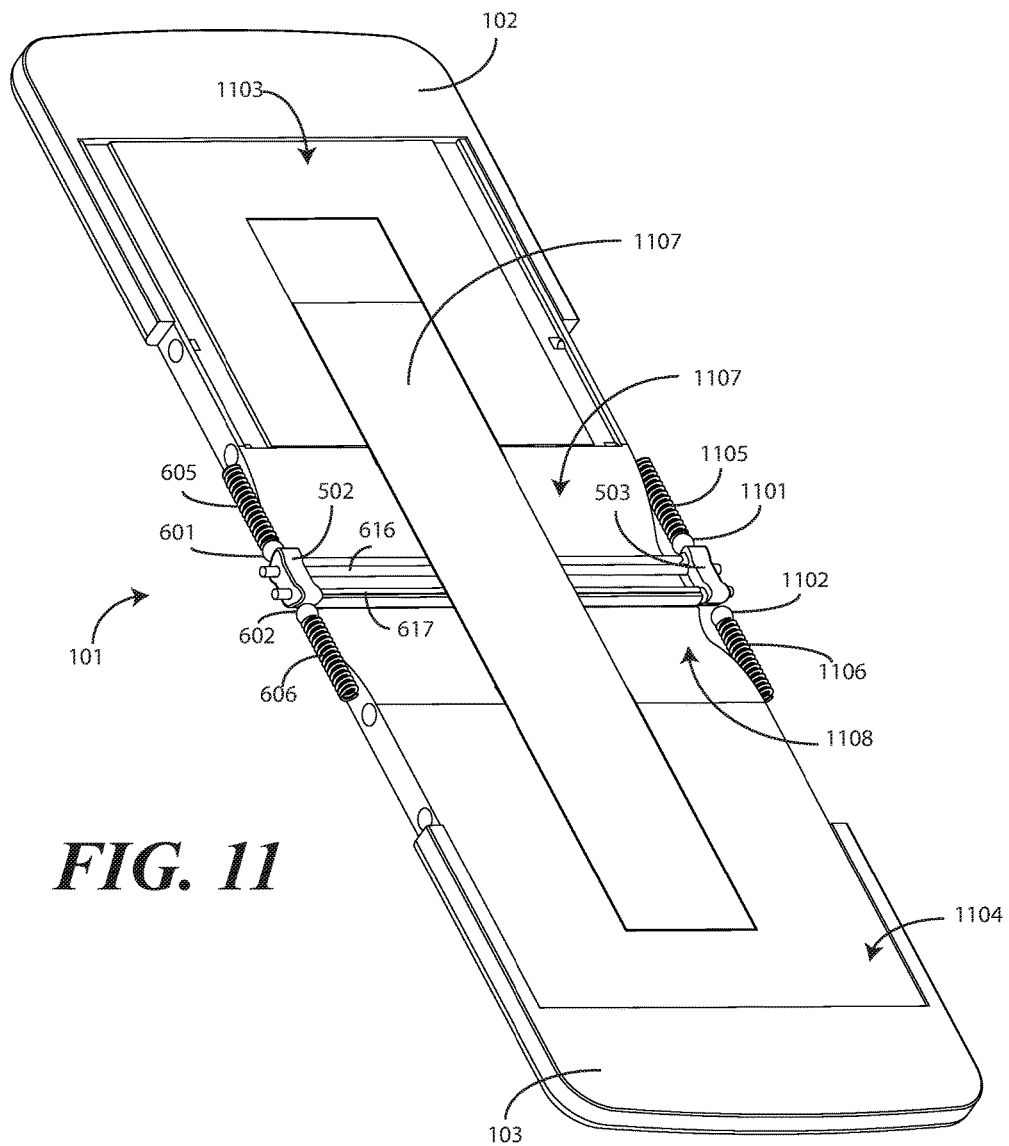
FIG. 11 illustrates a cut-away view of an electronic device illustrating explanatory hinge components when the first device housing is pivoted about the hinge away from the second device housing to an open position in accordance with one or more embodiments of the disclosure.

Turning now to FIG. 11, additional aspects of one or more embodiments of the disclosure can be seen. In FIG. 11, the first device housing 102 and the second device housing 103 are pivoted about the hinge 101 to the open position 401. For illustration purposes, housing members 508,509,510,511 have been removed so that action of the followers 601,602, 1101,1102 about the cams 502,503 can more readily be seen, as can the extension of the first pivot 616 and the second pivot 617 through the cams 502,503.

In one or more embodiments, the first device housing 102 and the second device housing 103 each define linear recesses 1103,1104 into which the flexible display may be positioned. Near the hinge 101, the first device housing 102 and the second device housing 103 define curvilinear recesses 1108,1109 that give the flexible display room to form a service loop when the first device housing 102 and the second device housing 103 pivot about the hinge 101 to the closed position (201).

Where electrical components, e.g., processors, memories, communication circuits, and other component described in the schematic block diagram (111) of FIG. 1 are positioned in each of the first device housing 102 and the second device housing 103, a flexible conductor 1107 can be included between the hinge 101 and the display. The flexible conductor 1107, which can bend as the first device housing 102 and the second device housing 103 pivot about the hinge 101 to the closed position (201), allows electrical signals to pass back and forth between the first device housing 102 and the second device housing 103. In some embodiments, the flexible conductor 1107 can provide mechanical support for the flexible display when the first device housing 102 and the second device housing 103 pivot about the hinge 101 to the closed position (201) as well.

In one or more embodiments, the springs 605,606,1105, 1106, the followers 601,602,1101,1102, and the cams 502, 503 can all be manufactured from electrically conductive materials. When this occurs, the springs 605,606,1105,1106, the followers 601,602,1101,1102, and the cams 502,503 define an electrically conductive pathway between the first device housing 102 and the second device housing 103. This electrically conductive pathway can be used in conjunction with the flexible conductor 1107. For instance, the flexible conductor may include traces and conduits that transfer power, digital signals, and analog signals between electrical components disposed in the first device housing 102 and the second device housing 103, while the electrically conductive pathway defined by the springs 605,606,1105,1106, the followers 601,602,1101,1102, and the cams 502,503 can provide a return path and/or define a common node for the electronic device 100. Other electrical configurations will be obvious to those of ordinary skill in the art having the benefit of this disclosure.

Figure 12:
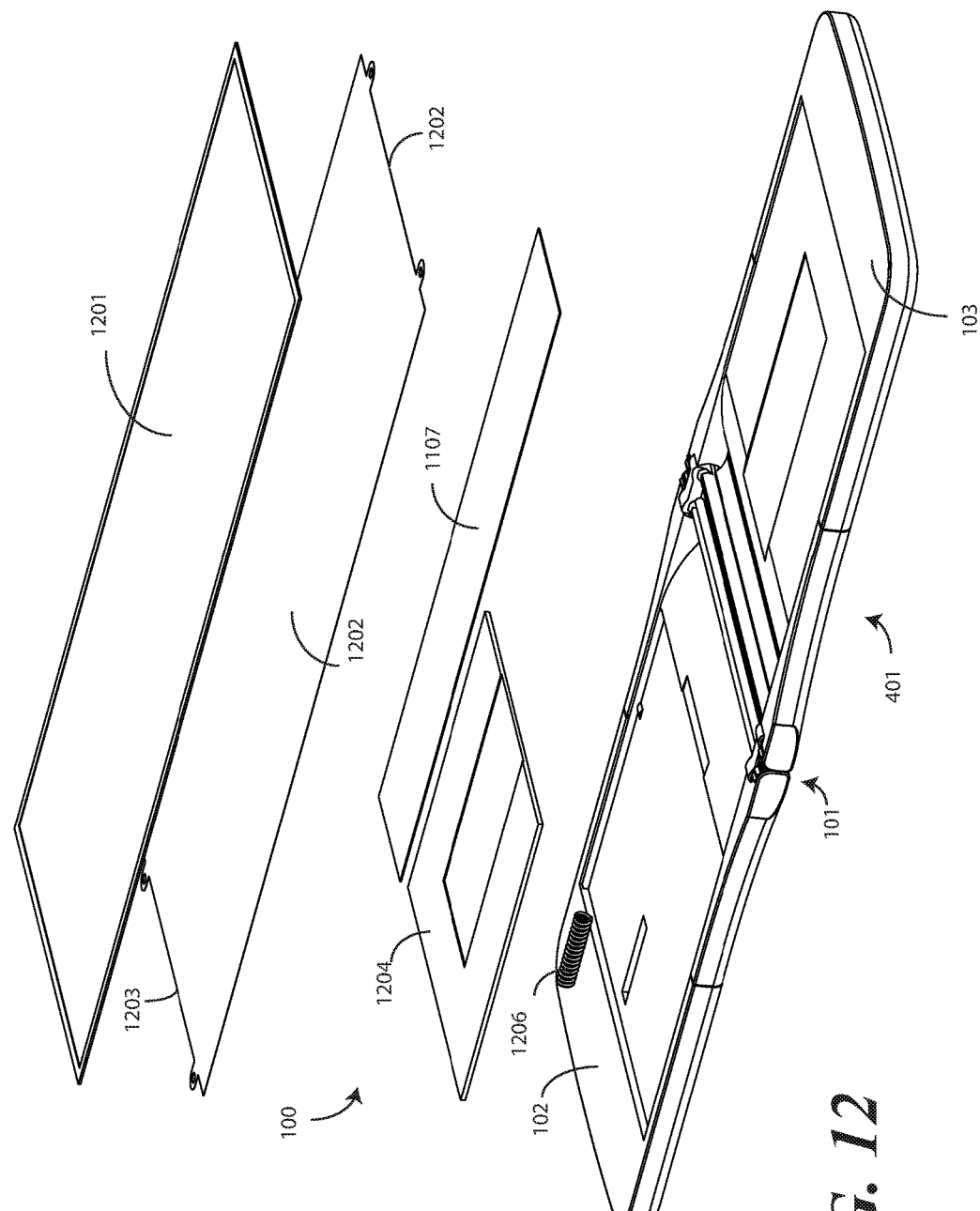
FIG. 12 illustrates an exploded view of one explanatory electronic device in accordance with one or more embodiments of the disclosure.

Turning now to FIG. 12, illustrated therein is an exploded view of one explanatory electronic device 100 configured in accordance with embodiments of the disclosure. As before, the electronic device 100 includes a first device housing 102 and a second device housing 103. A hinge 101 couples the first device housing 102 to the second device housing 103. The first device housing 102 is pivotable about the hinge 101 relative to the second device housing 103 as previously described.

A flexible display 1205, shown disposed beneath a flexible fascia 1201, can be coupled to the first device housing 102 and the second device housing 103 so as to span the hinge 101. This means that the flexible display 1205 deforms when the first device housing 102 pivots about the hinge 101 relative to the second device housing 103.

In this illustrative embodiment, a first end 1202 of the flexible display 1205 is coupled to the second device housing 103. The second end 1203 of the flexible display 1205 is coupled to a tray 1204. The tray 1204 is slidably coupled to the first device housing 102, and is biased away from the hinge 101 by at least a third spring 1206.

It should be noted that while only one tray 1204 is shown in FIG. 12, the second device housing 103 could likewise include a tray that is slidably coupled to the second device housing 103, and is biased away from the hinge 101 by at least a fourth spring. In such an embodiment, rather than being coupled to the second device housing 103, the first end 1202 of the flexible display 1205 could be coupled to the second tray.

Figure 13:
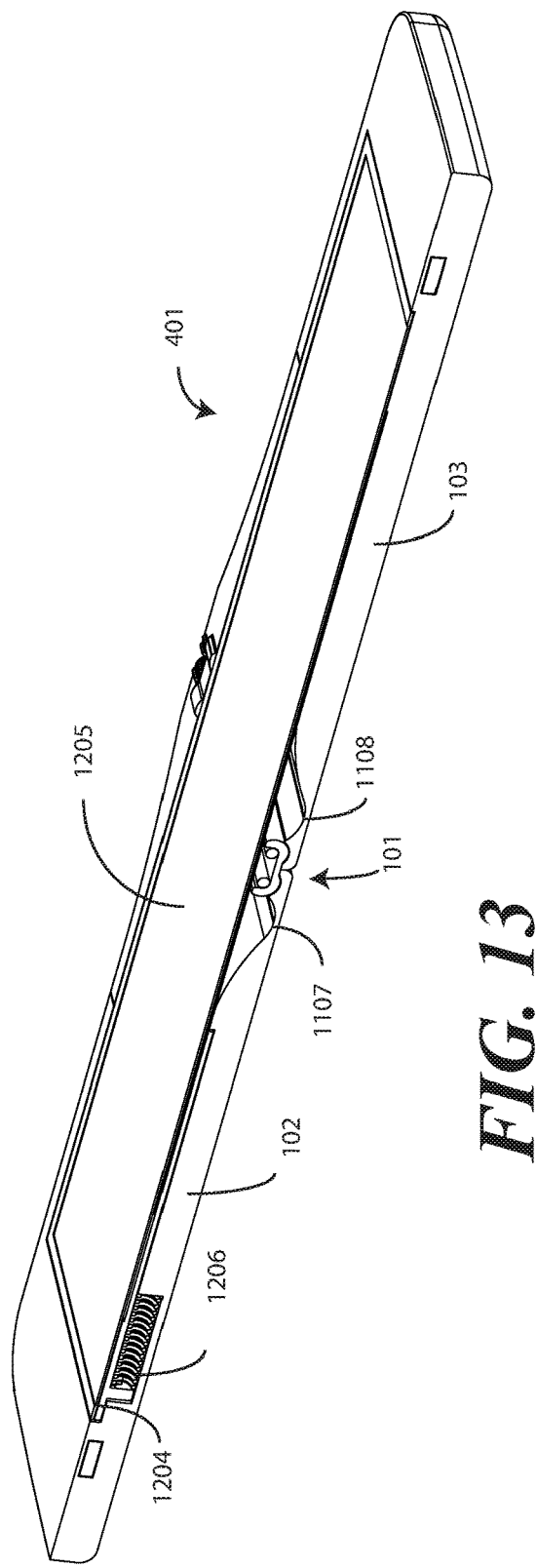
FIG. 13 illustrates a sectional view of one explanatory electronic device when the first device housing is pivoted about the hinge away from the second device housing to an open position in accordance with one or more embodiments of the disclosure.

In either embodiment, the springs bias the trays away from the hinge 101 to flatten the flexible display 1205 when the first device housing 102 pivots about the hinge 101 away from the second device housing 103 to the open position 401. In this illustrative embodiment, the flexible conductor 1107 is disposed beneath the flexible display 1205 and has a first end coupled to the second device housing 103, while a second end is coupled to a tray 1204. As shown in FIG. 13, the third spring 1206 biases the tray 1204 away from the hinge 101, and thus the second device housing 103 to straighten the flexible display 1205 when the first device housing 102 is pivoted about the hinge 101 away from the second device housing 103 to the open position 401

Figure 14:
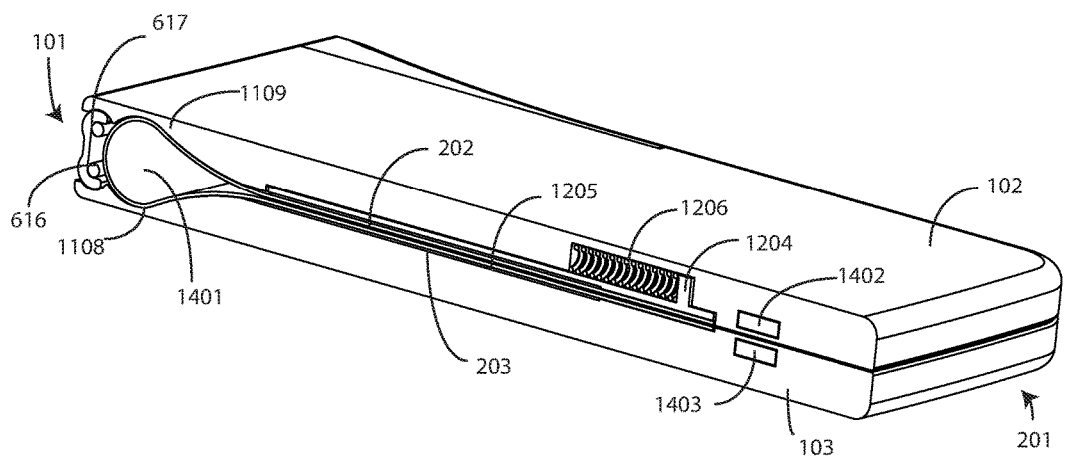
FIG. 14 illustrates a sectional view of one explanatory electronic device when the first device housing is pivoted about the hinge toward the second device housing to a closed position in accordance with one or more embodiments of the disclosure.

Also visible in FIG. 13 are the curvilinear recesses 1108,1109 that give the flexible display 1205 room to form a service loop when the first device housing 102 and the second device housing 103 pivot about the hinge 101 to the closed position (201). Turning to FIG. 14, this service loop 1401 is shown. This service loop 1401 occurs due to the fact that the flexible display 1205 deforms when the first device housing 102 pivots about the hinge 101 relative to the second device housing 103.

When the first device housing 102 and the second device housing 103 pivot about the hinge 101 to the closed position 201, the curvilinear recesses 1108,1109 translate radially about the first pivot 616 and the second pivot 617 to become exposed to, and to receive, the service loop 1401 of the flexible display 1205. This area for the service loop, which has a radius of at least five millimeters in one or more embodiments, prevents the flexible display 1205 from kinking or folding. It also works to minimize mechanical memory problems when the first device housing 102 and the second device housing 103 pivot about the hinge 101 to the open position (401).

Recall from above magnets 1402,1403 can be incorporated into the front surface 202 of the first device housing 102 and the front surface 203 of the second device housing 103. For instance, magnets 1402,1403 can be placed in the first device housing 102 and the second device housing 103 to retain the first device housing 102 and the second device housing 103 in the closed position 201. When in the closed position, the tray 1204 slides toward the hinge 101, thereby compressing the third spring 1206.

Figure 15:
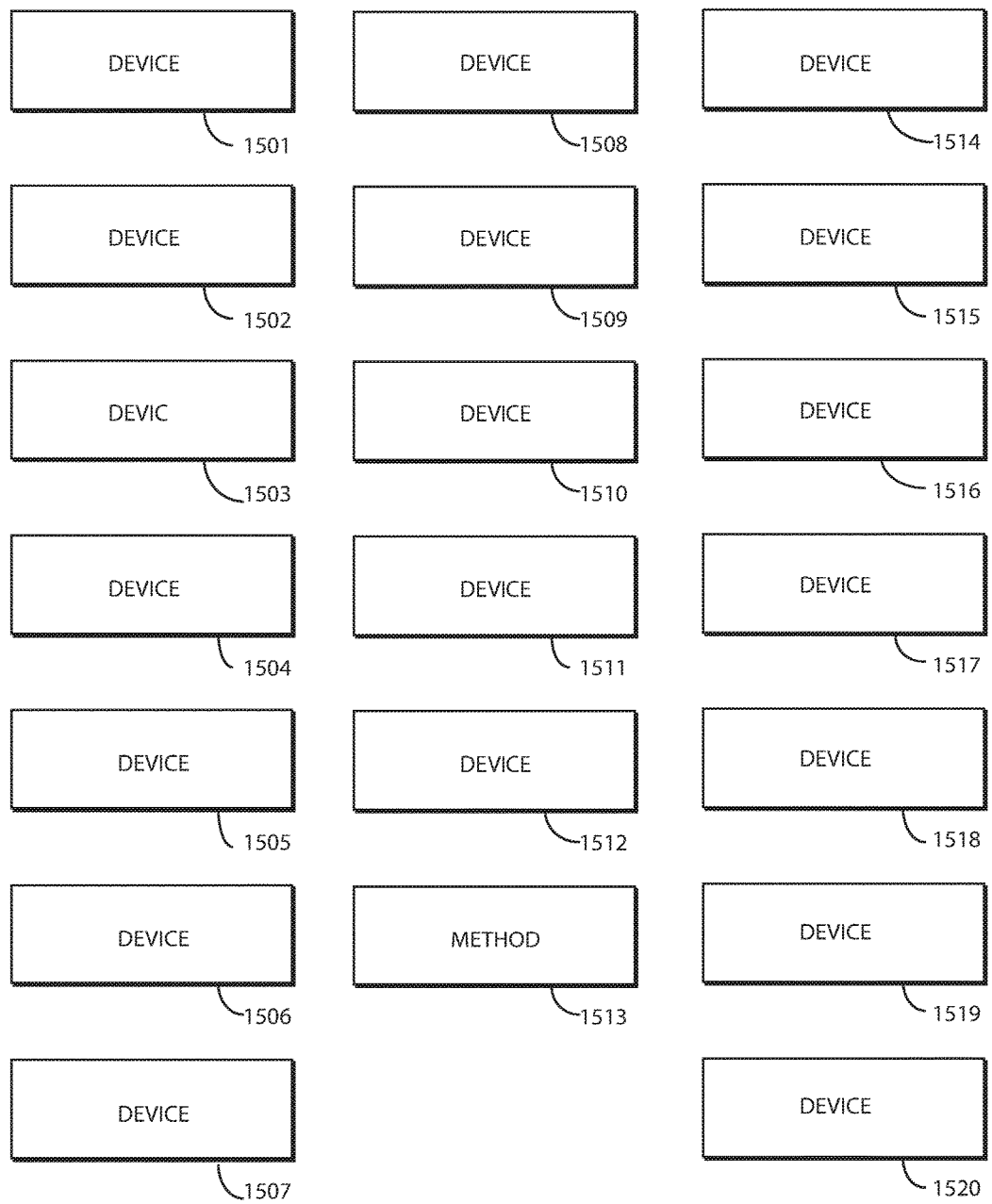
FIG. 15 illustrates various embodiments of the disclosure.

Turning now to FIG. 15, illustrated therein are various embodiments of the disclosure. At 1501, an electronic device comprises a first device housing and a second device housing. At 1501, the electronic device comprises a hinge coupling the first device housing to the second device housing. At 1501, the first device housing is pivotable about the hinge relative to the second device housing.

At 1501, the hinge comprises a cat head shaped cam. At 1501, the hinge further comprises a first follower, biased against a first side of the cat head shaped cam by a first spring disposed between the first follower and the first device housing. At 1501, the hinge also comprises a second follower, biased against a second side of the cat head shaped cam by a second spring disposed between the second follower and the second device housing.

At 1502, the cat head shaped cam of 1501 defines a first cat ear shaped protrusion and a second cat ear shaped protrusion. At 1502, the first cat ear shaped protrusion and the second cat ear shaped protrusion extend from a first side of the cat head shaped cam.

At 1503, the first follower and the second follower of 1502 situate between the first cat ear shaped protrusion and the second cat ear shaped protrusion when the first device housing is pivoted about the hinge toward the second device housing to a closed position. At 1504, the first cat ear shaped protrusion and the second cat ear shaped protrusion of 1503 situate between the first follower and the second follower when the first device housing is pivoted about the hinge away from the second device housing to an open position.

At 1505, the cat head shaped cam of 1502 defines a concave chin that is centrally located on a second side of the cat head shaped cam. At 1505, the second side is disposed opposite one or more pivot axes of the cat head shaped cam from the first side of 1502.

At 1506, the first device housing of 1505 defines a first protuberance abutting the cat head shaped cam. At 1506, the second device housing of 1505 defines a second protuberance abutting the cat head shaped cam. At 1506, apexes of the first protuberance and the second protuberance situate within the concave chin when the first device housing is pivoted about the hinge away from the second device housing to an open position.

At 1507, the first protuberance of 1506 terminates at a first wall. At 1507, the second protuberance of 1506 terminates at a second wall, At 1507, the first wall and the second wall abutt when the first device housing is pivoted about the hinge away from the second device housing to the open position.

At 1508, the first cat ear shaped protrusion and the second cat ear shaped protrusion of 1505 define a first detent retaining the first device housing at a first predefined angular alignment relative to the second device housing about the hinge. At 1508, the concave chin of 1505 defines a second detent retaining the first device housing at a second predefined angular alignment relative to the second device housing about the hinge.

At 1509, the first device housing of 1501 comprises at least a first toothed wheel. At 1509, the second device housing of 1501 comprises at least a second toothed wheel. At 1509, the at least the first toothed wheel engages the at least the second toothed wheel when the first device housing pivots about the hinge relative to the second device housing.

At 1510, the cat head shaped cam of 1509 is disposed farther interior of the electronic device than the at least the first toothed wheel and the at least the second toothed wheel. At 1511, the electronic device of 1510 further comprises a first pivot extending through a first eye aperture of the cat head shaped cam and a second pivot extending through a second eye aperture of the cat head shaped cam.

At 1512, the electronic device of 1501 further comprises a flexible display coupled to the first device housing and the second device housing and spanning the hinge. At 1512, the flexible display deforms when the first device housing pivots about the hinge relative to the second device housing.

At 1513, the electronic device of 1512 further comprises a tray. At 1513, the tray is slidably coupled to one of the first device housing or the second device housing. At 1513, the electronic device of 1512 further comprises at least a third spring. At 1513, a first end of the flexible display is coupled to the tray, while a second end of the flexible display is coupled to another of the first device housing or the second device housing. At 1513, the at least the third spring biases the tray away from the another of the first device housing or the second device housing when the first device housing is pivoted about the hinge away from the second device housing to an open position.

At 1514, an electronic device comprises a first device housing and a second device housing. At 1514, the electronic device further comprises a hinge coupling the first device housing to the second device housing. At 1514, the first device housing is pivotable about the hinge relative to the second device housing.

At 1514, the hinge comprises a cam, which is pivotable about both a first pivot and a second pivot. At 1514, the hinge further comprises a first follower, biased against a first side of the cam by a first spring disposed between the first follower and the first device housing. At 1514, the hinge further comprises a second follower, biased against a second side of the cam by a second spring disposed between the second follower and the second device housing. At 1514, the cam defines a first protrusion and a first detent, wherein the first pivot engages the cam along a first axis defined between the first protrusion and the first detent, and a second protrusion and a second detent, wherein the second pivot engages the cam along a second axis defined between the second protrusion and the second detent.

At 1515, the first follower and the second follower of 1514 and the second follower are positioned between the first protrusion and the second protrusion when the first device housing is pivoted about the hinge toward the second device housing to a closed position. At 1516, the first device housing defines a first protuberance abutting the cam, while the second device housing defines a second protuberance abutting the cam. At 1516, apexes of the first protuberance and the second protuberance are situated in the first detent and the second detent when the first device housing is pivoted about the hinge away from the second device housing to an open position.

At 1517, the first device housing comprises at least a first toothed wheel, while the second device housing comprising at least a second toothed wheel. At 1517, the at least the first toothed wheel engages the at least the second toothed wheel, thereby creating a symmetric angular rotation of the first device housing and the second device housing when the first device housing pivots about the hinge relative to the second device housing.

At 1518, the first spring, the second spring, the first follower, the second follower, and the cam of 1514 are manufactured from electrically conductive materials, thereby defining an electrically conductive pathway between the first device housing and the second device housing.

At 1519, an electronic device comprises a first device housing and a second device housing. At 1519, the first device housing defines a first protuberance, while the second device housing defining a second protuberance.

At 1519, the electronic device comprises a hinge coupling the first device housing to the second device housing. At 1519, the first device housing is pivotable about the hinge relative to the second device housing. At 1519, the hinge comprises a cam defining a first protrusion, a second protrusion, and a concave recess. At 1519, the hinge comprises a first follower, biased against the cam by a first spring disposed between the first follower and the first device housing. At 1519, the hinge comprises a second follower, biased against the cam by a second spring disposed between the second follower and the second device housing.

At 1519, the electronic device comprises a flexible display coupled to the first device housing and the second device housing and spanning the hinge. At 1519, the flexible display deforms when the first device housing pivots about the hinge relative to the second device housing.

At 1519, the first follower and the second follower situate between the first protrusion and the second protrusion when the first device housing is pivoted about the hinge toward the second device housing to a closed position. At 1519, apexes of the first protuberance and the second protuberance situate in the concave recess when the first device housing is pivoted about the hinge away from the second device housing to an open position.

At 1520, the first device housing of 1519 comprises a first toothed wheel. At 1520, the second device housing of 1519 comprises a second toothed wheel. At 1520, the first toothed engages the second toothed wheel when the first device housing pivots about the hinge relative to the second device housing.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. For example, while bending was the primary mode of changing a geometry of an electronic device, the multi-link hinges described herein could be used with other techniques, such as flexible housing portions, that allow squeezing, stretching, pulling, and shaking also to be used to change the geometry of an electronic device.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
   a first device housing and a second device housing;
   a hinge coupling the first device housing to the second device housing, the first device housing pivotable about the hinge relative to the second device housing; and
   the hinge comprising:
      a cat head shaped cam defining a first cat ear shaped protrusion, a second cat ear shaped protrusion, and a concave chin, the first cat ear shaped protrusion and the second cat ear shaped protrusion defining a first detent retaining the first device housing at a first predefined angular alignment relative to the second device housing about the hinge, the concave chin defining a second detent retaining the first device housing at a second predefined angular alignment relative to the second device housing about the hinge;
      a first follower, biased against a first side of the cat head shaped cam by a first spring disposed between the first follower and the first device housing; and
      a second follower, biased against a second side of the cat head shaped cam by a second spring disposed between the second follower and the second device housing.

2. The electronic device of claim 1, the first cat ear shaped protrusion and the second cat ear shaped protrusion extending from a first side of the cat head shaped cam.

3. The electronic device of claim 2, wherein the first follower and the second follower situate between the first cat ear shaped protrusion and the second cat ear shaped protrusion when the first device housing is pivoted about the hinge toward the second device housing to a closed position.

4. The electronic device of claim 3, wherein the first cat ear shaped protrusion and the second cat ear shaped protrusion situate between the first follower and the second follower when the first device housing is pivoted about the hinge away from the second device housing to an open position.

5. The electronic device of claim 2, the concave chin centrally located on a second side of the cat head shaped cam, the second side disposed opposite one or more pivot axes of the cat head shaped cam from the first side.

6. The electronic device of claim 1, the first device housing defining a first protuberance abutting the cat head shaped cam, the second device housing defining a second protuberance abutting the cat head shaped cam, wherein apexes of the first protuberance and the second protuberance situate within the concave chin when the first device housing is pivoted about the hinge away from the second device housing to an open position.

7. The electronic device of claim 6, the first protuberance terminating at a first wall, the second protuberance terminating at a second wall, the first wall and the second wall abutting when the first device housing is pivoted about the hinge away from the second device housing to the open position.

8. The electronic device of claim 1, the first cat ear shaped protrusion and the second cat ear shaped protrusion separated by a substantially flat cat forehead curvature.

9. The electronic device of claim 1, the first device housing comprising at least a first toothed wheel, the second device housing comprising at least a second toothed wheel, the at least the first toothed wheel engaging the at least the second toothed wheel when the first device housing pivots about the hinge relative to the second device housing.

10. The electronic device of claim 9, the cat head shaped cam disposed farther interior of the electronic device than the at least the first toothed wheel and the at least the second toothed wheel.

11. The electronic device of claim 10, further comprising a first pivot extending through a first eye aperture of the cat head shaped cam and a second pivot extending through a second eye aperture of the cat head shaped cam.

12. The electronic device of claim 1, further comprising a flexible display coupled to the first device housing and the second device housing and spanning the hinge, wherein the flexible display deforms when the first device housing pivots about the hinge relative to the second device housing.

13. The electronic device of claim 12, further comprising:
   a tray, slidably coupled to one of the first device housing or the second device housing; and
   at least a third spring;
   wherein:
      a first end of the flexible display is coupled to the tray;
      a second end of the flexible display is coupled to another of the first device housing or the second device housing;
      and the at least the third spring biases the tray away from the another of the first device housing or the second device housing when the first device housing is pivoted about the hinge away from the second device housing to an open position.

14. An electronic device, comprising:
   a first device housing and a second device housing;
   a hinge coupling the first device housing to the second device housing, the first device housing pivotable about the hinge relative to the second device housing; and
   the hinge comprising:
      a cam, pivotable about both a first pivot and a second pivot;
      a first follower, biased against a first side of the cam by a first spring disposed between the first follower and the first device housing; and
      a second follower, biased against a second side of the cam by a second spring disposed between the second follower and the second device housing;
   wherein the cam defines:
      a first protrusion and a first detent, wherein the first pivot engages the cam along a first axis defined between the first protrusion and the first detent; and
      a second protrusion and a second detent, wherein the second pivot engages the cam along a second axis defined between the second protrusion and the second detent;
   the first device housing defining a first protuberance abutting the cam, the second device housing defining a second protuberance abutting the cam, wherein apexes of the first protuberance and the second protuberance are situated in the first detent and the second detent when the first device housing is pivoted about the hinge away from the second device housing to an open position.

15. The electronic device of claim 14, wherein the first follower and the second follower are positioned between the first protrusion and the second protrusion when the first device housing is pivoted about the hinge toward the second device housing to a closed position.

16. The electronic device of claim 14, wherein when the first protrusion and the second protrusion are situated between the first follower and the second follower, one or both of the first spring or the second spring biases the first device housing and the second device housing toward the open position.

17. The electronic device of claim 14, the first device housing comprising at least a first toothed wheel, the second device housing comprising at least a second toothed wheel, the at least the first toothed wheel engaging the at least the second toothed wheel, thereby creating a symmetric angular rotation of the first device housing and the second device housing when the first device housing pivots about the hinge relative to the second device housing.

18. The electronic device of claim 14, wherein the first spring, the second spring, the first follower, the second follower, and the cam are manufactured from electrically conductive materials, thereby defining an electrically conductive pathway between the first device housing and the second device housing.

19. An electronic device, comprising:
  a first device housing and a second device housing, the first device housing defines a first protuberance, the second device housing defining a second protuberance;
  a hinge coupling the first device housing to the second device housing, the first device housing pivotable about the hinge relative to the second device housing; and
  a flexible display coupled to the first device housing and the second device housing and spanning the hinge, wherein the flexible display deforms when the first device housing pivots about the hinge relative to the second device housing,
  the hinge comprising:
    a cam defining a first protrusion, a second protrusion, and a concave recess;
    a first follower, biased against the cam by a first spring disposed between the first follower and the first device housing; and
    a second follower, biased against the cam by a second spring disposed between the second follower and the second device housing;
  wherein:
    the first follower and the second follower situate between the first protrusion and the second protrusion when the first device housing is pivoted about the hinge toward the second device housing to a closed position; and
    apexes of the first protuberance and the second protuberance situate in the concave recess when the first device housing is pivoted about the hinge away from the second device housing to an open position.

20. The electronic device of claim 19, the first device housing comprising a first toothed wheel, the second device housing comprising a second toothed wheel, the first toothed engaging the second toothed wheel when the first device housing pivots about the hinge relative to the second device housing.

* * * * *